United States Patent Office 3,211,422
Patented Oct. 12, 1965

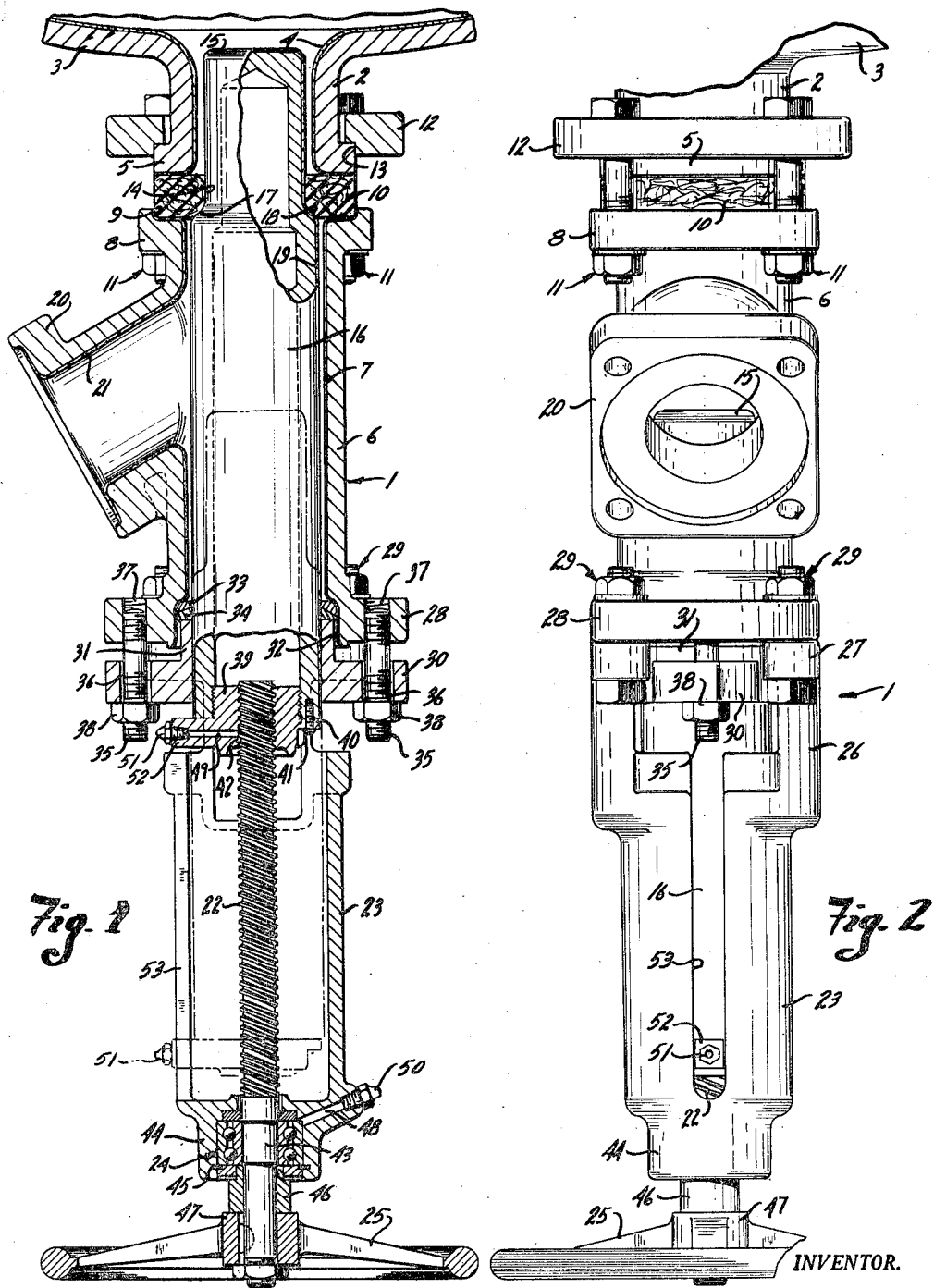

3,211,422
RAM-TYPE VALVE
Carl S. Brown, Cleveland, Ohio, assignor to A. O. Smith Corporation, Milwaukee, Wis., a corporation of New York
Filed June 8, 1962, Ser. No. 201,072
1 Claim. (Cl. 251—324)

This invention relates to a ram-type valve and particularly to a ram-type valve for selective closing of a chemical containing vessel and rector outlets.

In the storing and handling of acids and other chemicals, the valve units must be specially constructed to prevent corrosion of the component parts and must be of such a character to positively seal the openings. Generally, the best corrosion resistant alloys which can be economically produced corrode to some extent under the attack of the stronger acids and other chemicals. Ceramic materials or the like will generally eliminate the problems of corrosion but the limited strength of the materials require bulky and objectionable designs. A glass-lined valve arrangement having certain components such as the valve seat formed of non-corrosive ceramic materials and the like is shown in the Green Patent 2,454,160. As shown therein, a poppet-type valve is employed which is connected to a suitable rotating member or stem actuator for movement of the valve head or body into seating engagement with a non-corrosive ceramic valve seat.

Certain acids and other highly corrosive materials employed in chemical reactions may be coagulant or suspension variety. Where the reaction proceeds in vessels having normally closed outlets and particularly where the normal bottom outlets are provided, great care must be taken that the dispersed material does not settle out within the outlet and form a plug substantially reducing or eliminating the flow of the chemical through the outlet.

The present invention is directed to the provision of a relatively simple ram-type valve construction having a positive seating of the valve in the closed position. The ram-valve structure includes an arrangement which essentially prevents settling out of material within the attached outlet and provides complete free flow of material when the valve is opened.

In accordance with the present invention, the valve seat is provided immediately adjacent and in alignment with the outlet with a ram-type valve housing assembly secured extending coaxially from the outlet. A ram-type valve body is mounted for linear axial movement into and out of engagement with the valve seat on the discharge side of the outlet. The ram is provided with a valve shoulder spaced inwardly from the innermost end of the valve ram generally in accordance with the length between the valve seat and the beginning portion of the valve outlet adjacent the vessel body. When the ram is positioned axially into seating engagement with the valve seat, the projecting portion of the ram substantially fills the valve outlet and greatly minimizes any tendency for the material to settle within the outlet and thereby plug the outlet.

The annular seat is preferably formed of a glass-filled Teflon or other similar material against which the ram is seated. Glass-filled Teflon is a relatively high strength material and the ram may be seated with a relatively heavy compressive force to create a very tight and positive seal of the assembly in the valve. The housing for the valve is of a sufficient length such that retraction thereof completely removes the ram from the path of the liquid in passing through the valve outlet and permits a complete free flow of material. The adjoining surfaces of the valve and of the ram are coated with a vitreous or glass material to eliminate corrosion.

Framing dimensions of the preferred construction of the valve relative to the connecting pipe lines are short coupled. The operation of the ram-type valve allows holding of the rotating input against axial movement and particularly adapts the valve to remote actuation through a chain or fluid-motor drive.

The drawing furnished herewith illustrates the best mode presently contemplated for carrying out the invention.

In the drawing:

FIG. 1 is a vertical section of a valve mounted on a storage tank; and

FIG. 2 is an elevational view of the valve shown in FIG. 1.

Referring to the drawing, a valve unit 1 is secured to a bottom outlet neck 2 which is integrally formed or otherwise secured to form a part of a tank 3 of which only a lower fragmentary portion is shown. The present invention is particularly suited for use with a tank 3 containing a highly corrosive liquid and a glass lining 4 is applied to the internal surface of the tank 3 and the outlet neck 2 to prevent corrosion thereof.

The neck 2 is generally a tubular projection from tank 3 and has a smooth internal bore terminating in an annular outer flange 5 to which the valve 1 is secured. The glass lining 4 extends into and covers the internal surface of neck 2 and flange 5.

The valve 1 includes a tubular valve housing 6 connected to the flange 5 and extending outwardly in axial alignment therewith. The valve housing 6 also includes a smooth internal bore which is slightly larger than the internal diameter of the neck outlet 2 and coated with a suitable glass lining 7. The lower end of valve housing 6 is shaped to form a lower flange 8 which is generally aligned with and extends outwardly slightly of the outlet neck 2. Flange 8 is provided with a recess 9 and the outer diameter of which corresponds substantially to the outer diameter of the flnage 5. An annular or doughnut-shaped valve seating ring 10 is interposed between the flanges 5 and 8 and within the recess 9. A plurality of nut and bolt units 11 project through suitable apertures in the flange 8 and correspondingly aligned apertures in a clamping ring 12 which encircles the lower outer edge of flange 5. An inner edge recess 13 mates with the lower corner of the neck flange 5. The nut and bolt units 11 are drawn up to securely clamp the valve seating ring 10 between the flanges 5 and 8 with a hermetic joint therebetween.

The valve seating ring 10 projects radially inwardly of the housing 6 and neck 2 to define a valve opening 14 generally corresponding to a reduced end 15 of a valve ram 16. The upper edge of ring 10 is tapered and defines a tapered valve seat 17 facing the housing 6.

The valve ram 16 is generally a tubular hollow member having a shoulder 18 adjacent the end 15 tapered in accordance with the taper of the valve seat 17. The diameter of the ram 16 is slightly less than the internal bore 7 of the valve housing 6 with the reduced end 15 substantially corresponding to the internal axial bore 14 of the valve seating ring 10. In the closed position, as shown in full line in FIG. 1, the ram 16 is positioned with the shoulder 18 in engagement with the valve seat 17 and with the ram end 15 projecting upwardly into and substantially completely filling the outlet neck 2. The outlet neck 2 cannot therefore provide a substantial pocket within which the liquid within the tank 3 can accumulate and materials within the liquid may settle out to plug the opening. The outer surface of the ram 16 is provided with a suitable glass coating 19 to prevent corrosion of the member.

A valve outlet 20 is integrally formed with the valve housing 6 immediately adjacent the flange 8 and extends angularly therefrom. The outlet 20 includes a smooth internal bore 21 generally corresponding to the size of the internal diameter or bore of the outlet neck 2. Thus, when the ram 16 is removed from seating engagement with the seating ring 10, a continuous path is provided for free flow of the liquid from the tank 3.

The valve seating ring 10 is formed of a non-corrosive plastic material having a suitable glass filament filler to create high strength material for engagement by the ram 17 under a substantial compressive force. Applicant has found that a particularly suitable material is a glass-filled Teflon which is essentially inert and is not subject to corrosion.

The ram 16 is supported for axial movement by a threaded shaft 22 which is threadedly secured to the outer end of the ram 16. Shaft 22 projects axially through a valve bonnet 23 and is supported at the outer or upper end thereof by a ball bearing unit 24. A hand wheel 25 is secured to the outermost end of the threaded shaft 22 for manual rotation of the threaded shaft 22. The shaft 22 is held against axial movement and rotation thereof causes the ram 16 to move axially on the shaft 22.

The valve bonnet 23 is a tubular member having an integrally formed lower mounting arm 26 on opposite sides thereof terminating in attachment flanges 27. The flanges 27 are provided with front and back apertures in alignment with corresponding apertures in a square mounting frame 28 provided on the upper end of the housing valve 6. Nut and bolt units 29 pass through the aligned apertures in each corner of the flanges 27 and 28 and securely interconnect the valve bonnet 23 to the lower end of the housing 6. Arms 26 are laterally spaced and define a central transverse opening within which a vertical movable follower 30 is slidably mounted upon the upper end of the ram 16.

Generally, the follower 30 is a tubular member having a hub 31 projecting inwardly between the ram 16 and a recess or offset portion 32 in the lower end of the housing 6. Sealing rings 33 and 34 are disposed within the offset portion 32 between the inner end of the hub 31 and the base of the offset portion 32. The seating rings 33 and 34 have complementary and mating chamfered surfaces and which are forced into tight sealing engagement as a result of forcing follower hub 31 into the recess.

The follower 31 projects outwardly between the arms 26 and bonnet mounting flanges 27. Positioning studs 35 project through suitable openings 36 in the projection of follower 31 and thread into correspondingly tapped openings 37 in the adjacent flange 28 of the valve housing 6. Positioning nuts 38 are threaded onto the lower ends of each stud 35 and bear on the adjacent portion of follower 30 to selectively position and create the previously described sealing engagement of rings 33 and 34 about the ram 16 and the outer end of the housing 6.

The sealing rings 33 and 34 are preferably formed of glass-filled Teflon or other suitable material to provide a good liquid seal adjacent the outer end of the housing 6 without establishing excessive frictional forces on the ram 16 which would prevent or make the axial movement thereof difficult.

The seal established by rings 33 and 34 thus allows the ram 16 to readily move axially of the housing 6 by rotation of the hand wheel 25 and the attached shaft 22. The upper end of ram 16 is secured to shaft 22 in the illustrated embodiment of the invention as follows.

A ram nut 39 is threaded into the correspondingly threaded upper end of the ram 16 and includes an encircling flange 40 which bottoms on the uppermost end of the ram. A cap screw 41 secures flange 40 to the ram 16 and prevents rotation of the ram nut. The shaft 22 is threaded through a suitable tapped opening in the ram nut 39 as at 42 and projects upwardly through the bonnet 23.

The upper end of the shaft 22 is stepped as at 43 within the top wall 44 of the bonnet 23. The ball-bearing unit 24 is secured within the top wall 44 by a split ring 45 and bears on a shoulder formed by the stepped portion 43 of the shaft. A tubular clamp 46 is located on shaft 22 between tthe upper end of bearing 24 and a hub 47 of handwheel 26 to clamp shaft 22 from axial movement.

Lubrication passageways 48 and 49 are provided in the top wall 44 of bonnet 23 and in ram nut 39, respectively, for periodic lubrication of the bearing unit 47 and the threaded junction 42. The outer ends of passageways 48 and 49 are closed by similar suitable grease fittings 50 and 51.

The position of the ram 16 is indicated in the illustrated embodiment by the position of the ram nut 39 in the bonnet 23 as follows. A projection 52 of the ram nut 39 moves within an axial slot 53 formed in the bonnet 23. The position of the projection 52 within the slot 53 corresponds to the position of the seating shoulder 18 of the ram 16 with respect to the valve seat 17 of valve seating ring 10 and provides a clear indication of the positioning of the ram 16.

In operation, the hand wheel 25 is turned and rotates the shaft 22 within the ram nut 39. The shaft 22 is held against axial movement and consequently, the ram 16 moves axially of the shaft 22 and positions the upper end 15 of the ram 16 either in the full line position shown in FIG. 1 to close valve 1, the dotted line position shown in FIG. 1 and the full line position shown in FIG. 2 to open the valve 1.

In the closed position as shown in FIG. 1, the annular shoulder 18 seats on the tapered valve seat 17 of the ring 10 to provide a very positive closure.

The valve structure provides an excellent seal and when in the open position the valve ram 16 is completely removed from the flow path. The inlet and outlet paths are of the same size and the framing dimensions relative to the pipe lines, not shown, are short coupled.

The inner reduced portion of the ram 16 projects into the outlet neck 2 and substantially fills the neck. This essentially eliminates the pocket normally provided by the neck and prevents settling out of the material within the tank 3 and plugging of the outlet neck 2.

The present invention provides a valve structure which, when closed, provides positive seating and essentially eliminates product build-up in the vessel outlet and, when open, provides a complete free flow.

Various modes of carrying out the invention are contemplated as being within the scope of the following claim particularly pointing out and distinctly claiming the subject matter which is regarded as the invention.

I claim:

In a valve assembly secured to a vessel containing a liquid having dispersed material suspended therein,
  (a) an outlet neck secured to the vessel and having an internal bore for discharge of the liquid,
  (b) a valve body having an internal bore corresponding to the bore of the neck and having an outlet extending laterally from the bore, said outlet having an internal bore substantially corresponding to the valve body,
  (c) means mounting the valve body on the outlet neck with the internal bores aligned,
  (d) a valve ring clamped between the outlet neck and the valve body and projecting radially inwardly and defining a valve seat,
  (e) a ram slidably mounted in the valve body and having a reduced inner end corresponding substantially to the bore of the valve ring and providing a valve shoulder between the two portions, the length of said reduced portion being selected to substantially equal the distance from the valve seat to the end of the outlet neck secured to the vessel, and (f) means positioning the valve ram between a valve closure position wherein said valve shoulder firmly engages said valve seat and a valve open position wherein said ram is completely removed from the internal bore between said outlet neck and said valve outlet.

References Cited by the Examiner

UNITED STATES PATENTS

| | | | |
|---|---|---|---|
| 1,947,257 | 2/34 | Fritz et al. | 137—375 |
| 2,454,160 | 11/48 | Greene | 137—375 |
| 2,469,109 | 5/49 | Goecke | 137—375 |
| 2,530,433 | 11/50 | Jaegle | 251—144 XR |
| 2,989,990 | 6/61 | Bass et al. | 251—368 XR |

M. CARY NELSON, *Primary Examiner.*